(12) United States Patent
Sherman et al.

(10) Patent No.: US 9,944,835 B2
(45) Date of Patent: *Apr. 17, 2018

(54) UREA-BASED PRESSURE SENSITIVE ADHESIVES

(71) Applicant: 3M INNOVATIVE PROPERTIES COMPANY, St. Paul, MN (US)

(72) Inventors: Audrey A. Sherman, Woodbury, MN (US); Wendi J. Winkler, Minneapolis, MN (US); Scott M. Tapio, Falcon Heights, MN (US); Robert J. Reuter, Oakdale, MN (US); James P. DiZio, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/001,934

(22) Filed: Jan. 20, 2016

(65) Prior Publication Data

US 2016/0137893 A1 May 19, 2016

Related U.S. Application Data

(63) Continuation of application No. 12/810,168, filed as application No. PCT/US2008/086596 on Dec. 12, 2008, now Pat. No. 9,266,989.

(60) Provisional application No. 61/016,866, filed on Dec. 27, 2007.

(51) Int. Cl.

| C08F 283/00 | (2006.01) |
|---|---|
| C08F 283/06 | (2006.01) |
| C08F 290/06 | (2006.01) |
| C08G 18/50 | (2006.01) |
| C08G 18/67 | (2006.01) |
| C08G 18/75 | (2006.01) |
| C08G 18/81 | (2006.01) |
| C08G 63/685 | (2006.01) |
| C08G 71/02 | (2006.01) |
| C08K 5/101 | (2006.01) |
| C09J 175/02 | (2006.01) |
| C09J 175/16 | (2006.01) |
| C09J 7/02 | (2006.01) |
| C09J 11/06 | (2006.01) |

(52) U.S. Cl.
CPC ......... *C09J 175/16* (2013.01); *C08F 283/006* (2013.01); *C08F 283/06* (2013.01); *C08F 290/06* (2013.01); *C08F 290/061* (2013.01); *C08F 290/062* (2013.01); *C08F 290/065* (2013.01); *C08F 290/067* (2013.01); *C08G 18/5042* (2013.01); *C08G 18/672* (2013.01); *C08G 18/755* (2013.01); *C08G 18/8116* (2013.01); *C08G 63/685* (2013.01); *C08G 71/02* (2013.01); *C09J 7/021* (2013.01); *C09J 11/06* (2013.01); *C09J 175/02* (2013.01); *C08G 2170/40* (2013.01); *C08K 5/101* (2013.01); *Y10T 428/2896* (2015.01)

(58) Field of Classification Search
CPC .............. C08G 18/5042; C08G 18/672; C08G 18/755; C08G 18/8116; C08G 2170/40; C08G 71/02; C08G 63/685; C08F 283/006; C08F 283/06; C08F 290/06; C08F 290/061; C08F 290/062; C08F 290/067; C08F 290/065; C08K 5/101; C09J 175/16; C09J 175/02; C09J 7/021; C09J 11/06; Y10T 428/2896

See application file for complete search history.

(56) References Cited

U.S. PATENT DOCUMENTS

| RE24,906 E | 12/1960 | Ulrich |
|---|---|---|
| 4,554,324 A | 11/1985 | Husman et al. |
| 4,737,559 A | 4/1988 | Kellen et al. |
| 5,045,601 A | 9/1991 | Capelli |
| 5,223,465 A | 6/1993 | Ueki et al. |
| RE34,605 E | 5/1994 | Schrenk et al. |
| 5,360,659 A | 11/1994 | Arends et al. |
| 5,407,971 A | 4/1995 | Everaerts et al. |
| 5,506,279 A | 4/1996 | Babu et al. |
| 5,579,162 A | 11/1996 | Bjornard |
| 5,686,544 A | 11/1997 | Pocius |
| 5,882,774 A | 3/1999 | Jonza et al. |
| 6,049,419 A | 4/2000 | Wheatley et al. |

(Continued)

FOREIGN PATENT DOCUMENTS

| CN | 1192756 | 9/1998 |
|---|---|---|
| EP | 539099 | 4/1993 |

(Continued)

OTHER PUBLICATIONS

Extended European Search Report for Application No. 08868240.6, dated Jan. 20, 2012, 6 pages.
International Search Report for PCT/US2010/031689, dated Oct. 27, 2010, 3 pages.
U.S. Appl. No. 61/417,582, filed Nov. 20, 2010, entitled Method of Applying Optical Film to Large Formal Disiplay Panel.
International Search Report for International Application No. PCT/US2008/086596, 4 pages.
Written Opinion of International Application No. PCT/U52008/086596, 4 pages.

*Primary Examiner* — Patrick D Niland
(74) *Attorney, Agent, or Firm* — Jeffrey M. Olofson

(57) ABSTRACT

Non-silicone urea-based adhesives are disclosed which are prepared by the polymerization of reactive oligomers with the general formula X—B—X, where X is an ethylenically unsaturated group and B is a unit free of silicone and containing urea groups. The reactive oligomers can be prepared from polyamines through chain extension reactions using diaryl carbonates followed by capping reactions. Adhesive articles, including optical adhesive articles may be prepared using the disclosed non-silicone urea-based adhesives.

25 Claims, No Drawings

(56) References Cited

U.S. PATENT DOCUMENTS

| | | | |
|---|---|---|---|
| 6,063,890 A | 5/2000 | Tye | |
| 6,083,856 A | 7/2000 | Joseph et al. | |
| 6,207,727 B1 | 3/2001 | Beck et al. | |
| 6,369,123 B1 | 4/2002 | Stark et al. | |
| 6,448,339 B1 | 10/2002 | Tomita | |
| 6,492,028 B2 | 10/2002 | Kotera et al. | |
| 6,518,359 B1 | 2/2003 | Clemens | |
| 6,642,304 B1 | 11/2003 | Hansen | |
| 6,660,389 B2 | 12/2003 | Liu | |
| 6,664,359 B1 | 12/2003 | Kangas et al. | |
| 6,720,387 B1 | 4/2004 | Stark et al. | |
| 6,800,680 B2 | 10/2004 | Stark et al. | |
| 6,824,820 B1 | 11/2004 | Kinning et al. | |
| 7,071,263 B2 | 4/2006 | Cheng et al. | |
| 9,266,989 B2 * | 2/2016 | Sherman | C08F 283/006 |
| 2004/0202879 A1 | 10/2004 | Xai et al. | |
| 2006/0173128 A1 | 8/2006 | Connolly | |
| 2007/0082969 A1 | 4/2007 | Malik | |
| 2007/0083030 A1 | 4/2007 | Bruchmann | |
| 2007/0160811 A1 | 7/2007 | Gaides | |
| 2008/0121341 A1 | 5/2008 | Landoll | |
| 2011/0039099 A1 | 2/2011 | Sherman | |
| 2013/0149502 A1 * | 6/2013 | Dudley | B32B 7/06 428/172 |

FOREIGN PATENT DOCUMENTS

| | | |
|---|---|---|
| GB | 1556797 | 11/1979 |
| WO | WO 84/03837 | 10/1984 |
| WO | 1994/20583 | 9/1994 |
| WO | 1999/42536 | 8/1999 |
| WO | WO 2000-24839 | 5/2000 |
| WO | WO 2002-06413 | 1/2002 |
| WO | 2004094549 | 11/2004 |
| WO | WO 2005-019369 | 3/2005 |
| WO | 2005/044470 | 5/2005 |
| WO | 2005/044897 | 5/2005 |
| WO | WO 2007-030584 | 3/2007 |
| WO | WO 2009-049008 | 4/2009 |
| WO | WO 2009-050787 | 4/2009 |
| WO | WO 2009-105297 | 8/2009 |
| WO | WO 2010-132176 | 11/2010 |

* cited by examiner

UREA-BASED PRESSURE SENSITIVE ADHESIVES

FIELD OF THE DISCLOSURE

The present disclosure relates generally to the field of adhesives, specifically to the field of pressure sensitive adhesives that are non-silicone urea-based.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive, is particularly preferred for many applications.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

SUMMARY

The use of adhesives, especially pressure sensitive adhesives, in areas such as the medical, electronic and optical industries is increasing. The requirements of these industries place additional demands upon the pressure sensitive adhesive beyond the traditional properties of tack, peel adhesion and shear strength. New classes of materials are desirable to meet the increasingly demanding performance requirements for pressure sensitive adhesives.

A class of non-silicone urea-based adhesives, specifically pressure sensitive adhesives, are disclosed. These urea based adhesives are prepared from curable non-silicone urea-based reactive oligomers. The reactive oligomers contain free radically polymerizable groups.

In some embodiments the disclosure includes an adhesive comprising a cured mixture containing at least one X—B—X reactive oligomer, in which X comprises an ethylenically unsaturated group, and B comprises a non-silicone segmented urea-based unit. The adhesive may also include other ethylenically unsaturated monomers. The urea-based unit may contain polyoxyalkylene groups.

In other embodiments the disclosure includes a polymerizable reactive oligomer comprising the structure X—B—X, in which X comprises an ethylenically unsaturated group and B comprises a non-silicone segmented urea-based unit. The reactive oligomers may be prepared from polyamines through chain extension and/or capping reactions.

In some embodiments the disclosure includes a curable reaction mixture comprising at least one X—B—X reactive oligomer, in which X comprises an ethylenically unsaturated group, and B comprises a non-silicone segmented urea-based unit; and an initiator. The curable reaction mixture may also include other ethylenically unsaturated monomers.

Also disclosed are methods of preparing an adhesive comprising providing a curable composition comprising at least one X—B—X reactive oligomer, in which X comprises an ethylenically unsaturated group, and B comprises a non-silicone segmented urea-based unit, and an initiator; and curing the curable composition.

Additionally, adhesive articles are disclosed. Among the adhesive articles disclosed are adhesive articles comprising a pressure sensitive adhesive comprising the cured reaction product of at least one X—B—X reactive oligomer, in which X comprises an ethylenically unsaturated group, and B comprises a non-silicone segmented urea-based unit; and a substrate. In some embodiments the substrate is an optical substrate. Some articles also include a second substrate.

DETAILED DESCRIPTION

Non-silicone urea-based adhesives, especially non-silicone urea-based pressure sensitive adhesives, are prepared by the free radical polymerization of non-silicone containing urea-based reactive oligomers. The reactive oligomers are prepared by end-capping non-silicone segmented urea-based polyamines with ethylenically unsaturated groups. The non-silicone urea-based polyamines are prepared by chain extension of polyamines with carbonates. In some embodiments the non-silicone urea-based adhesives contain polyoxyalkylene (polyether) groups.

The term "adhesive" as used herein refers to polymeric compositions useful to adhere together two adherends. Examples of adhesives are heat activated adhesives and pressure sensitive adhesives.

Heat activated adhesives are non-tacky at room temperature but become tacky and capable of bonding to a substrate at elevated temperatures. These adhesives usually have a Tg (glass transition temperature) or melting point (Tm) above room temperature. When the temperature is elevated above the Tg or Tm, the storage modulus usually decreases and the adhesive becomes tacky.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "non-silicone" as used herein refers to segmented copolymers or units of segmented copolymers that are free of silicone units. The terms silicone or siloxane are used interchangeably and refer to units with dialkyl or diaryl siloxane (—$SiR_2O$—) repeating units.

The term "urea-based" as used herein refers to macromolecules that are segmented copolymers which contain at least one urea linkage.

The term "segmented copolymer" refers to a copolymer of linked segments, each segment constitutes primarily a single structural unit or type of repeating unit. For example, a polyoxyalkylene segmented copolymer may have the following structure:

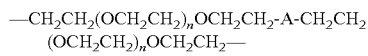
(OCH₂CH₂)ₙOCH₂CH₂— where A is the linkage between the 2 polyoxyalkylene segments.

The term "reactive oligomer" as used herein refers to a macromolecule which contains terminal free radically polymerizable groups and at least 2 segments which are linked. "Urea-based reactive oligomers" are macromolecules which contain terminal free radical polymerizable groups and at least 2 segments which are linked by urea linkages.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, —CH₂CH₂(OCH₂CH₂)ₙOCH₂CH₂—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —Rᵃ—Arᵃ— where Rᵃ is an alkylene and Arᵃ is an arylene (i.e., an alkylene is bonded to an arylene).

The term "(meth)acrylate" refers to monomeric acrylic or methacrylic esters of alcohols. Acrylate and methacrylate monomers are referred to collectively herein as "(meth) acrylate" monomers.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically clear" refers to an adhesive or article that has a high light transmittance over at least a portion of the visible light spectrum (about 400 to about 700 nm), and that exhibits low haze.

Unless otherwise indicated, "self wetting" refers to an adhesive which is very soft and conformable and is able to be applied with very low lamination pressure. Such adhesives exhibit spontaneous wet out to surfaces.

Unless otherwise indicated, "removable" refers to an adhesive that has relatively low initial adhesion (permitting temporary removability from and repositionability on a substrate after application), with a building of adhesion over time (to form a sufficiently strong bond), but remains "removable" i.e. the adhesion does not build beyond the point where it is permanently cleanly removable from the substrate.

Non-silicone urea-based polyamines are used to prepare the non-silicone urea-based adhesives. The preparation of non-silicone urea-based polyamines may be achieved through the reaction of polyamines with carbonates. A wide variety of different types of polyamines may be used. In some embodiments the polyamines are polyoxyalkylene polyamines. Such polyamines are also sometimes referred to as polyether polyamines.

The polyoxyalkylene polyamine may be, for example, a polyoxyethylene polyamine, polyoxypropylene polyamine, polyoxytetramethylene polyamine, or mixtures thereof. Polyoxyethylene polyamine may be especially useful when preparing the adhesive for medical applications, for example, where high vapor transfer medium may be desirable.

Many polyoxyalkylene polyamines are commercially available. For example, polyoxyalkylene diamines are available under trade designations such as D-230, D-400, D-2000, D-4000, DU-700, ED-2001 and EDR-148 (available from Huntsman Chemical; Houston, Tex. under the family trade designation JEFFAMINE). Polyoxyalkylene triamines are available under trade designations such as T-3000 and T-5000 (available from Huntsman Chemical; Houston, Tex.).

A variety of different carbonates may be reacted with the polyamine to give the non-silicone urea-based polyamine. Suitable carbonates include alkyl, aryl and mixed alkyl-aryl carbonates. Examples include carbonates such as ethylene carbonate, 1,2- or 1,3-propylene carbonate, diphenyl carbonate, ditolyl carbonate, dinaphthyl carbonate, ethyl phenyl carbonate, dibenzyl carbonate, dimethyl carbonate, diethyl carbonate, dipropyl carbonate, dibutyl carbonate, dihexyl carbonate, and the like. In some embodiments the carbonate is a diaryl carbonate, such as for example, diphenyl carbonate.

In some embodiments the polyoxyalkylene polyamine is a polyoxyalkylene diamine which yields a non-silicone urea-based diamine. In one specific embodiment, the reaction of 4 equivalents of polyoxyalkylene diamine with 3 equivalent of carbonate yields a chain-extended, non-silicone urea-based diamine and 6 equivalents of an alcohol byproduct, as shown in reaction scheme I below (R in this case is an aryl group such as phenyl and n is an integer of 30-40):

Reaction Scheme I

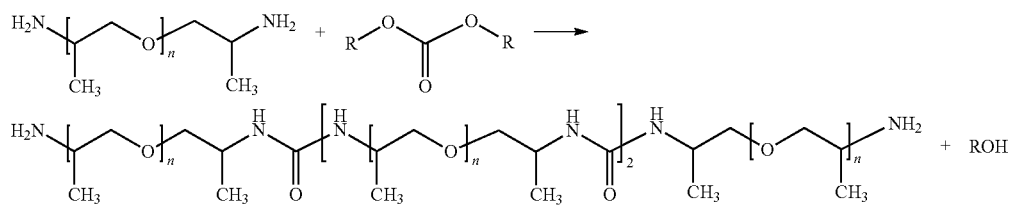

A reaction scheme such as shown for Reaction Scheme I is sometimes called a "chain extension reaction" because the starting material is a diamine and the product is a longer chain diamine. The chain extension reaction shown in Reaction Scheme I can be used to give higher or lower molecular weight by varying the equivalents of diamine and carbonate used.

The non-silicone urea-based reactive oligomers of this disclosure have the general structure X—B—X. In this structure the B unit is a non-silicone urea-based group and the X groups are ethylenically unsaturated groups.

The B unit is non-silicone and contains at least one urea group and may also contain a variety of other groups such as urethane groups, amide groups, ether groups, carbonyl groups, ester groups, alkylene groups, heteroalkylene groups, arylene groups, heteroarylene groups, aralkylene groups, or combinations thereof. The composition of the B unit results from the choice of precursor compounds used to form the X—B—X reactive oligomer.

To prepare the non-silicone urea-based reactive oligomers of this disclosure, two different reaction pathways may be used. In the first reaction pathway a non-silicone urea-based polyamine such as a non-silicone urea-based diamine is reacted with an X—Z compound. The Z group of the X—Z compound is an amine reactive group and the X group is an ethylenically unsaturated group. A variety of Z groups are useful for this reaction pathway including carboxylic acids, isocyantes, epoxies, azlactones and anhydrides. The X group contains an ethylenically unsaturated group (i.e. a carbon-carbon double bond) and is linked to the Z group. The link between the X and Z groups may be a single bond or it may be a linking group. The linking group may be an alkylene group, a heteroalkylene group, an arylene group, a heteroarylene group, an aralkylene group, or a combination thereof.

Examples of X—Z compounds include isocyanatoethyl methacrylate, alkenyl azlactones such as vinyl dimethyl azlactone and isopropenyl dimethyl azlactone, m-isopropenyl-α,α-dimethyl benzyl isocyanate, and acryloyl ethyl carbonic anhydride. In some embodiments the X—Z compound is isocyanatoethyl methacrylate or vinyl dimethyl azlactone.

In some embodiments the non-silicone urea-based diamine is reacted with an isocyanate functional (meth)acrylate as shown in reaction scheme II below in which the $R^1$ group is an alkylene linking group such as a —$CH_2CH_2$— group and n is an integer of 30-40:

Reaction Scheme II

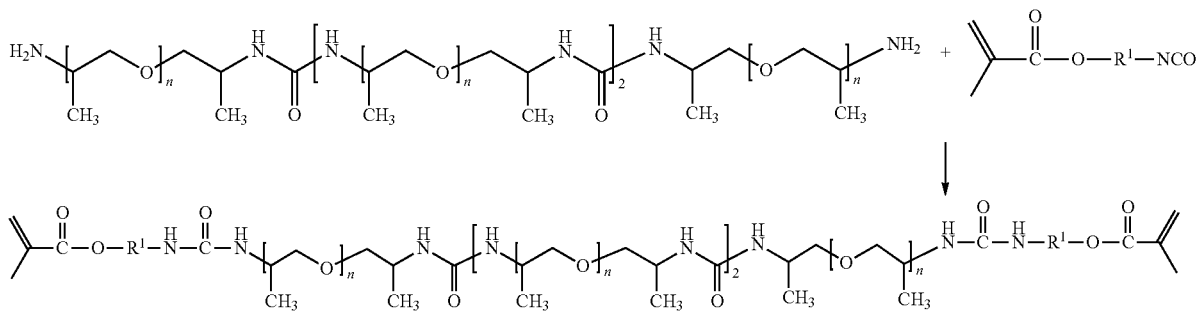

In some embodiments the non-silicone urea-based diamine is reacted with an azlactone as shown in reaction scheme III below in which the $R^2$ groups are alkyl groups such as methyl groups and n is as previously defined:

Reaction Scheme III

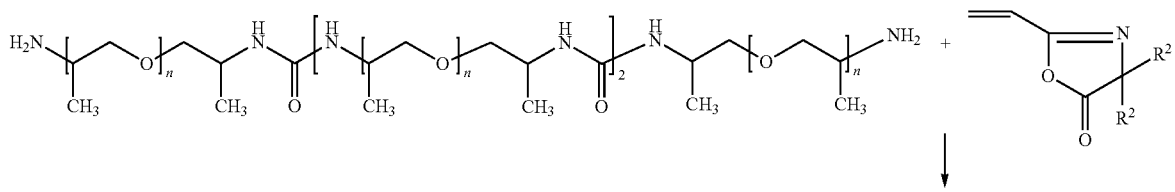

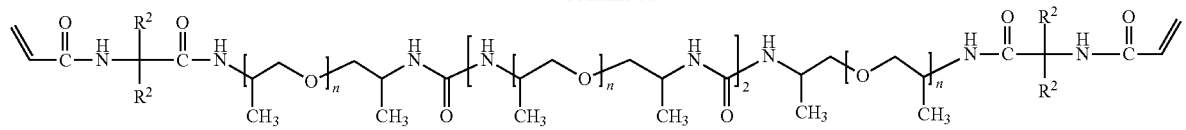

-continued

A second reaction pathway to obtain the non-silicone urea-based reactive oligomers of this disclosure involves a two step reaction sequence. In the first step a non-silicone urea-based diamine is capped with a difunctional Z—W—Z compound. The Z groups of the Z—W—Z compound are amine reactive groups. A variety of Z groups are useful for this reaction pathway including carboxylic acids, isocyantes, epoxies, and azlactones. Typically Z is an isocyanate. The W group of the Z—W—Z compound is a linking group that links the Z groups. The W group may be an alkylene group, a heteroalkylene group, an arylene group, a heteroarylene group, an aralkylene group, or a combination thereof Examples of useful Z—W—Z compounds are diisocyanates. Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5,5'-tetraethyl) biphenylmethane, 4,4'-diisocyanato-3,3'-dimethoxybiphenyl, 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanato-hexane, 1,12-diisocyanatododecane, 2-methyl-1,5diisocyanatopentane, and cycloaliphatic diisocyanates such as methylene-dicyclohexylene-4,4'-diisocyanate, and 3-isocyanatomethyl-3,5,5-trimethyl-cyclohexyl isocyanate (isophorone diisocyanate).

Typically the Z—W—Z compound is an aliphatic or cycloaliphatic diisocyanate such as 1,6-diisocyanatohexane or isophorone diisocyanate.

For example, a non-silicone urea-based diamine may be reacted with a diisocyanate to a generate a non-silicone urea-based diisocyanate. The non-silicone urea-based diisocyanate can then be further reacted with a Y—X compound. The Y of the Y—X compound is an isocyanate reactive group such as an alcohol, an amine or a mercaptan. Typically the Y group is an alcohol. The X group contains an ethylenically unsaturated group (i.e. a carbon-carbon double bond) and is linked to the Y group. The link between the X and Y groups may be a single bond or it may be a linking group. The linking group may be an alkylene group, a heteroalkylene group, an arylene group, a heteroarylene group, an aralkylene group, or a combination thereof.

Examples of useful Y—X compounds include hydroxyl functional (meth)acrylates such as (meth)acrylic acid monoesters of polyhydroxy alkyl alcohols such as 1,2-ethanediol, 1,2-propanediol, 1,3-propane diol, the various butyl diols, the various hexanediols, glycerol, such that the resulting esters are referred to as hydroxyalkyl (meth)acrylates. In some embodiments, the Y—X compound is hydroxyl ethyl acrylate.

In some embodiments the non-silicone urea-based diamine is reacted with a diisocyanate to form a non-silicone urea-based diisocyanate. This non-silicone urea-based diisocyanate is then reacted with a hydroxyl functional (meth) acrylate as shown in reaction scheme IV below in which OCN—$R^3$—NCO is isophorone diisocyanate and $R^4$ is an alkylene linking group such as a —$CH_2CH_2$— group, n is as previously defined, and the catalyst is dibutyltin dilaurate:

Reaction Scheme IV

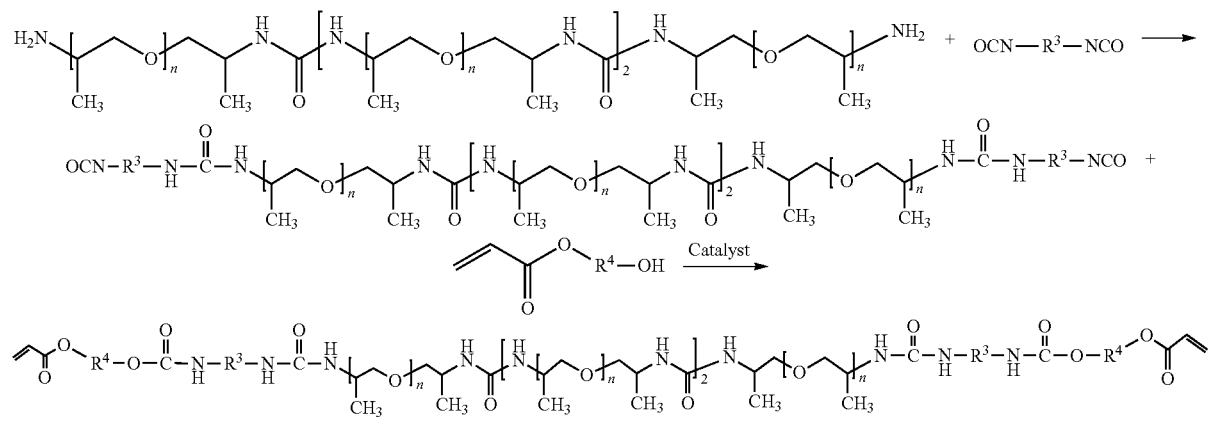

Non-silicone urea-based pressure sensitive adhesives may be prepared by polymerizing X—B—X reactive oligomers through the ethylenically unsaturated X groups to form polymers with adhesive properties. The polymers may contain only X—B—X reactive oligomers or they may be copolymers in which additional monomers or reactive oligomers are incorporated. As used herein, additional monomers or reactive oligomers are collectively referred to as ethylenically unsaturated materials.

Among the additional monomers useful for incorporation are monomers which contain ethylenically unsaturated groups and are therefore co-reactive with the reactive oligomers. Examples of such monomers include (meth)acrylates, (meth)acrylamides, alpha-olefins, and vinyl compounds such as vinyl acids, acrylonitriles, vinyl esters, vinyl ethers, styrenes and ethylenically unsaturated oligomers. In some instances more than one type of additional monomer may be used.

Examples of useful (meth)acrylates include alkyl (meth)acrylates, aromatic (meth)acrylates, and silicone acrylates. In applications in which it is desirable that the entire adhesive composition be silicone free, silicone acrylates are generally not used. Alkyl (meth)acrylate monomers are those in which the alkyl groups comprise 1 to about 20 carbon atoms (e.g., from 3 to 18 carbon atoms). Suitable acrylate monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. An example of an aromatic (meth)acrylate is benzyl acrylate.

Examples of useful (meth)acrylamides, include acrylamide, methacrylamide and substituted (meth)acrylamides such as N,N-dimethyl acrylamide, N,N-dimethyl methacrylamide, N,N-dimethylaminopropyl methacrylamide, N,N-diethylaminopropyl methacrylamide. N,N-dimethylaminoethyl acrylamide, N,N-dimethylaminoethyl methacrylamide, N,N-diethylaminoethyl acrylamide, and N,N-diethylaminoethyl methacrylamide.

The alpha-olefins useful as additional monomers generally include those with 6 or greater carbon atoms. The alpha-olefins with fewer than 6 carbon atoms tend to be too volatile for convenient handling under ambient reaction conditions. Suitable alpha-olefins include, for example, 1-hexene, 1-octene, 1-decene and the like.

Examples of useful vinyl compounds include: vinyl acids such as acrylic acid, itaconic acid, methacrylic acid; acrylonitriles such as acrylonitrile and methacrylonitrile; vinyl esters such as vinyl acetate and the vinyl esters of carboxylic acids such as neodecanoic, neononanoic, neopentanoic, 2-ethylhexanoic, or propionic acids; vinyl ethers such as alkyl vinyl ethers; and styrenes such as styrene or vinyl toluene. Other vinyl compounds that may be useful include N-vinylcaprolactam, vinylidene chloride, N-vinyl pyrrolidone, N-vinyl formamide, and maleic anhydride. For some uses, for example electronic applications, it may be desirable to include vinyl compounds that are free of acidic groups.

Examples of ethylenically unsaturated oligomers useful for copolymerization with the urea-based reactive oligomers include, for example, ethylenically unsaturated silicone oligomers such as are describe in the PCT publication number WO 94/20583 and macromolecular monomers with relatively high glass transition temperatures as described in U.S. Pat. No. 4,554,324 (Husman et al.). In applications in which it is desirable that the entire adhesive composition be silicone free, silicone oligomers are generally not used.

The non-silicone urea-based adhesives can be made by solvent processes, solventless processes (e.g., continuous solventless processes or polymerization on a surface or in a mold) or by a combination of these methods.

Some of the processes suitable for the preparation of the non-silicone urea-based adhesives include the free radical polymerization of non-silicone urea-based reactive oligomers with optional ethylenically unsaturated materials in a reactor to form the non-silicone urea-based adhesive. The non-silicone urea-based adhesive can then be removed from the reaction vessel. Alternatively, the polymerization can be carried out by continuously mixing the reactants and depositing the reactants on a surface (e.g., release liner or substrate) or into a mold and polymerizing the mixture in place.

In some embodiments, it has been found convenient to deposit a mixture of the non-silicone urea-based reactive oligomer, additional monomers if desired, and initiator onto a surface, activate the initiator and cure the adhesive on the surface. The mixture may or may not contain a solvent. If solvent is used, the cured adhesive is typically dried to remove the solvent.

The initiator may be either a thermal initiator or a photoinitiator. Suitable thermal free radical initiators which may be utilized include, but are not limited to, those selected from azo compounds, such as 2,2'-azobis(isobutyronitrile); hydroperoxides, such as tert-butyl hydroperoxide; and, peroxides, such as benzoyl peroxide and cyclohexanone peroxide. Photoinitiators which are useful include, but are not limited to, those selected from benzoin ethers, such as benzoin methyl ether or benzoin isopropyl ether; substituted benzoin ethers, such as anisole methyl ether; substituted acetophenones, such as 2,2-diethoxyacetophenone and 2,2-dimethoxy-2-phenyl acetophenone; substituted alpha-ketols, such as 2-methyl-2-hydroxy propiophenone; aromatic sulfonyl chlorides, such as 2-naphthalene sulfonyl chloride; and, photoactive oximes, such as 1-phenyl-1,2-propanedione-2-(ethoxycarbonyl)oxime. For both thermal- and radiation-induced polymerizations, the initiator is present in an amount of about 0.05% to about 5.0% by weight based upon the total weight of the monomers.

In addition to the reactants, optional property modifying additives can be mixed with the reactive oligomers and optional other monomers provided that they do not interfere with the polymerization reaction. Typical property modifiers include tackifying agents (tackifiers) and plasticizing agents (plasticizers) to modify the adhesive performance of the formed adhesive composition. If used, the tackifiers and plasticizers are generally present in amounts ranging from about 15% to about 45% by weight, or even from about 15% to about 35% by weight.

Useful tackifiers and plasticizers are those conventionally used in the adhesive arts. Examples of suitable tackifying resins include terpene phenolics, alpha methyl styrene resins, rosin derived tackifiers, monomeric alcohols, oligomeric alcohols, oligomeric glycols, and mixtures thereof. Examples of useful plasticizing resins include terpene phenolics, rosin derived plasticizers, polyglycols and mixtures thereof. In some embodiments the plasticizer is isopropyl myristate or a polypropylene glycol.

In addition, other property modifiers, such as fillers, may be added if desired, provided that if and when incorporated, such additives are not detrimental to the properties desired in the final composition. Fillers, such as fumed silica, fibers (e.g., glass, metal, inorganic, or organic fibers), carbon black, glass or ceramic beads/bubbles, particles (e.g., metal, inorganic, or organic particles), polyaramids (e.g., those available from DuPont Chemical Company; Wilmington, Del. under the trade designation, KEVLAR), and the like which can be added in amounts up to about 30% by weight. Other additives such as dyes, inert fluids (e.g., hydrocarbon oils), pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these systems in amounts of generally from about 1 to about 50 percent by total volume of the composition.

The adhesives formed by the polymerization of the non-silicone urea-based reactive oligomers may be pressure sensitive adhesives or heat activated adhesives. Generally pressure sensitive adhesives are formed. These pressure sensitive adhesives are useful in a wide array of applications.

The use of reactive oligomers instead of low molecular weight monomers to generate the pressure sensitive adhesive polymers results in polymers that are free of volatile unreacted materials and other low molecular weight impurities after polymerization. Residual monomers and low molecular weight impurities may be problematic in certain applications, such as medical and electronic applications. In medical and electronic applications, residual monomers and impurities may cause, for example, undesirable odor or potential contamination of substrates/articles (e.g., hard disk drives) in which they are in contact. In addition, the use of reactive oligomers which are free of silicone is desirable in certain industries, such as the electronics industry, where silicone contamination is a concern.

The adhesive, or the reactive mixture which upon polymerization forms the adhesive, may be coated onto a surface to form a wide variety of adhesive articles. For example, the adhesive can be applied to films or sheeting products (e.g., decorative, reflective, and graphical), labelstock, tape backings, release liners, and the like. The substrate can be any suitable type of material depending on the desired application.

The adhesive can be formed into a film or coating by either continuous or batch processes. An example of a batch process is the placement of a portion of the adhesive between a substrate to which the film or coating is to be adhered and a surface capable of releasing the adhesive film or coating to form a composite structure. The composite structure can then be compressed at a sufficient temperature and pressure to form a adhesive coating or film of a desired thickness after cooling. Alternatively, the adhesive can be compressed between two release surfaces and cooled to form an adhesive transfer tape useful in laminating applications.

Continuous forming methods include drawing the adhesive out of a film die and subsequently contacting the drawn adhesive to a moving plastic web or other suitable substrate. A related continuous method involves extruding the adhesive and a coextruded backing material from a film die and cooling the layered product to form an adhesive tape. Other continuous forming methods involve directly contacting the adhesive to a rapidly moving plastic web or other suitable preformed substrate. Using this method, the adhesive is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

Adhesives can also be coated using a solvent-based method. For example, the adhesive can be coated by such methods as knife coating, roll coating, gravure coating, rod coating, curtain coating, and air knife coating. The adhesive mixture may also be printed by known methods such as screen printing or inkjet printing. The coated solvent-based adhesive is then dried to remove the solvent. Typically, the coated solvent-based adhesive is subjected to elevated temperatures, such as those supplied by an oven, to expedite drying of the adhesive.

In some embodiments it may be desirable to impart a microstructured surface to one or both major surfaces of the adhesive. It may be desirable to have a microstructured surface on at least one surface of the adhesive to aid air egress during lamination. If it is desired to have a microstructured surface on one or both surfaces of the adhesive layer, the adhesive coating or layer may be placed on a tool or a liner containing microstructuring. The liner or tool can then be removed to expose an adhesive layer having a microstructured surface.

The thickness of the adhesive layer tends to be at least about 1 micrometer, at least 5 micrometers, at least 10 micrometers, at least 15 micrometers, or at least 20 micrometers. The thickness is often no greater than about 200 micrometers, no greater than about 175 micrometers, no greater than about 150 micrometers, or no greater than about 125 micrometers. For example, the thickness can be 1 to 200 micrometers, 5 to 100 micrometers, 10 to 50 micrometers, 20 to 50 micrometers, or 1 to 15 micrometers.

In some embodiments, the pressure sensitive adhesives are optically clear. Optically clear adhesives may be used to make a wide array of optical articles. Such articles may include an optical film, a substrate or both. Such uses include information displays, window coverings, graphic articles and the like.

Articles are provided that include an optical film and a pressure sensitive adhesive layer adjacent to at least one major surface of the optical film. The articles can further include another substrate (e.g., permanently or temporarily attached to the pressure sensitive adhesive layer), another adhesive layer, or a combination thereof. As used herein, the term "adjacent" can be used to refer to two layers that are in direct contact or that are separated by one or more layers. Often, adjacent layers are in direct contact.

In some embodiments, the resulting articles can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, screens or displays, cathode ray tubes, polarizers, reflectors, and the like.

Any suitable optical film can be used in the articles. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, and antireflective films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings or a combination thereof. Coatings such as hardcoats, anti-fog coatings, and anti-scratch coatings that provide enhanced durability, are desirable in applications such as, for example, touch screen sensors, display screens, graphics applications and the like.

Examples of privacy coatings include, for example, blurry or hazy coatings to give obscured viewing or louvered films to limit the viewing angle.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

The substrate included in the article can contain polymeric materials, glass materials, ceramic materials, metal-containing materials (e.g., metals or metal oxides), or a combination thereof. The substrate can include multiple layers of material such as a support layer, a primer layer, a hard coat layer, a decorative design, and the like. The substrate can be permanently or temporarily attached to an adhesive layer. For example, a release liner can be temporarily attached and then removed for attachment of the adhesive layer to another substrate.

The substrate can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing.

Exemplary substrates include, but are not limited to, the outer surface of an electronic display such as liquid crystal display or a cathode ray tube, the outer surface of a window or glazing, the outer surface of an optical component such as a reflector, polarizer, diffraction grating, mirror, or lens, another film such as a decorative film or another optical film, or the like.

Representative examples of polymeric substrates include those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

In other embodiments, the substrate is a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

The release liner can be removed to adhere the optical film to another substrate (i.e., removal of the release liner exposes a surface of an adhesive layer that subsequently can be bonded to another substrate surface).

In some embodiments the adhesives are self wetting and removable. The adhesives exhibit great conformability permitting them to spontaneously wet out substrates. The surface characteristics also permit the adhesives to be bonded and removed from the substrate repeatedly for repositioning or reworking. The strong cohesive strength of the adhesives gives them structural integrity limiting cold flow and giving elevated temperature resistance in addition to permanent removability. In some embodiments the initial removability of an adhesive coated article bonded to a glass substrate, as measured by the 90° Peel Adhesion test described in the Examples section below, is no greater than 2.9 Newtons/decimeter (75 grams per inch). Upon aging for one week at room temperature the removability, as measured by the 90° Peel Adhesion test described in the Examples section below, is no more than 7.7 Newtons/decimeter (200 grams per inch). In other embodiments, the removability after aging for at least one week at room temperature, as measured by the 90° Peel Adhesion test described in the Examples section below, is no more than 15.4 (400 grams per inch), 7.7 Newtons/decimeter (200 grams per inch) or even 3.9 Newtons/decimeter (100 grams per inch).

Exemplary adhesive articles in which the self wetting and removability features are especially important include, for example: large format articles such as graphic articles and protective films; and information display devices.

Large-format graphic articles or protective films typically include a thin polymeric film backed by a pressure sensitive adhesive. These articles may be difficult to handle and apply onto a surface of a substrate. The large format article may be applied onto the surface of a substrate by what is sometimes called a "wet" application process. The wet application process involves spraying a liquid, typically a water/surfactant solution, onto the adhesive side of the large format article, and optionally onto the substrate surface. The liquid temporarily "detackifies" the pressure sensitive adhesive so the installer may handle, slide, and re-position the large format article into a desired position on the substrate surface. The liquid also allows the installer to pull the large format article apart if it sticks to itself or prematurely adheres to the surface of the substrate. Applying a liquid to the adhesive may also improve the appearance of the installed large format article by providing a smooth, bubble free appearance with good adhesion build on the surface of the substrate.

Examples of a large format protective films include window films such as solar control films, shatter protection films, decoration films and the like. In some instances the film may be a multilayer film such as a multilayer IR film (i.e., an infrared reflecting film), such as a microlayer film having selective transmissivity such as an optically clear but infrared reflecting film as described in U.S. Pat. No. 5,360,659 (Arends et al.).

While the wet application process has been used successfully in many instances, it is a time consuming and messy process. A "dry" application process is generally desirable for installing large format graphic articles. Adhesives that are self wetting and removable may be applied with a dry installation process. The articles are easily attached to a large substrate because they are self wetting and yet they may be easily removed and repositioned as needed.

In other applications, such as information display devices, the wet application process cannot be used. Examples of information display devices include devices with a wide range of display area configurations including liquid crystal displays, plasma displays, front and rear projection displays, cathode ray tubes and signage. Such display area configurations can be employed in a variety of portable and non-portable information display devices including personal digital assistants, cell phones, touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, bumper stickers, etc) reflective sheeting and the like.

A wide variety of information display devices are in use, both illuminated devices and non-illuminated devices. Many of these devices utilize adhesive articles, such as adhesive coated films, as part of their construction. One adhesive article frequently used in information display devices is a protective film. Such films are frequently used on information display devices that are frequently handled or have exposed viewing surfaces.

In some embodiments, the adhesives of this disclosure may be used to attach such films to information display devices because the adhesives have the properties of optical clarity, self wetting and removability. The adhesive property of optical clarity permits the information to be viewed through the adhesive without interference. The features of self wetting and removability permit the film to be easily applied to display surface, removed and reworked if needed during assembly and also removed and replaced during the working life of the information display device.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
| --- | --- |
| VDM | vinyl dimethyl azlactone |
| IEM | isocyanatoethylmethacrylate |
| IPDI | Isophorone diisocyanate |
| HEA | Hydroxyethyl acrylate |
| HCl | Hydrochloric acid |
| Polyamine-1 | Polyoxyalkylene polyamine of approximately 2,000 molecular weight, commercially available as "JEFFAMINE D-2000" from Huntsman, Houston, TX. |
| Photoinitiator-1 | Photoinitiator "DAROCUR 1173" commercially available from Ciba, Hawthorne, NY. |
| Photoinitiator-2 | Photoinitiator "DAROCUR 4265" commercially available from Ciba, Hawthorne, NY. |
| PET | UV-primed polyester film of polyethylene terephthalate available under the trade name "Dupont 617" having a thickness of 127 micrometers (5 mils) or 51 micrometers (2 mils) from Dupont Teijin Films, Richmond, VA. |
| Release Liner | Polyester film of 51 micrometer thickness (2 mils) coated on one side with silicone release agent, commercially available from CP Film, Martinsville, VA as "T10 Release Liner". |
| UBDA 8K | Urea-based diamine of approximately 8,000 molecular weight, prepared as described in Synthesis Example 1. |
| UBDA 12K | Urea-based diamine of approximately 12,000 molecular weight, prepared as described in Synthesis Example 2. |
| AcAmine | Acrylated diamine prepared as described in Synthesis Example 3. |
| IPM | Isopropyl myristate |
| PPG | Polypropylene glycol of 3,000 molecular weight |

Test Methods
90° Peel Adhesion

Adhesive coatings of 51 micrometers (2 mils) thickness on 51 micrometer (2 mil) thick PET film were cut into 2.54 centimeter by 15 centimeter strips. Each strip was then adhered to a 6.2 centimeter by 23 centimeter clean, solvent washed glass coupon using a 2-kilogram roller passed once over the strip. The bonded assembly dwelled at room temperature for about one minute and was tested for 90° peel adhesion using an IMASS slip/peel tester with a 90° peel testing assembly (Model SP2000, commercially available from Instrumentors Inc., Strongsville, Ohio) at a rate of 2.3 meters/minute (90 inches/minute) over a five second data collection time. Three samples were tested; the reported peel adhesion value is an average of the peel adhesion value from each of the three samples. Data was measured in grams/inch width and converted to Newtons per decimeter (N/dm).

Wet Out Test

Adhesive coatings of 51 micrometers (2 mils) thickness on 127 micrometer (5 mil) thick PET film were cut into sample squares of 12.7 by 12.7 centimeters (5 by 5 inches). A 7.6 by 7.6 centimeter (3 by 3 inch) square was marked in the center of the backside of each sample square. The liner was removed from the sample square and one corner of the sample square was placed on the surface of an isopropanolwashed glass coupon. The sample square was dropped onto the glass surface. The wet out time was measured using a stopwatch and was started when the wet out front reached any part of the inner marked square and ended when the inner square was completely wet out. The wet out time was recorded, and is reported as the time (in seconds) per area wet out (in square centimeters).

Titration Method to Determine Molecular Weight

To determine the molecular weight of a synthesized UBDA, a measured sample weight (about 4-6 grams) was placed in a jar and tetrahydrofuran (about 3 times the weight of the sample) was added with mixing to form a uniform solution. A solution of the indicator bromophenol blue was added until the color was a deep blue. With constant stirring, the sample solution was titrated by adding 1.0 Normal HCl (aq) dropwise until a color change from blue to yellow indicated that the endpoint was reached. The endpoint volume of HCl titrated was recorded and the molecular weight was calculated.

SYNTHESIS EXAMPLES

Synthesis Example 1

Preparation of UBDA 8K

A sample of Polyamine-1 (4 moles) was degassed under vacuum at 100° C. for 1 hour. Freshly ground diphenyl carbonate (3 moles) was added and the mixture stirred to give a uniform mixture. The mixture was heated to 160° C. for 3 hours under vacuum to remove phenol byproduct. The resultant product was a urea chain extended diamine of approximately 8,000 molecular weight (confirmed by titration, using the method described above).

Synthesis Example 2

Preparation of UBDA 12K

A sample of Polyamine-1 (6 moles) was reacted with a sample of diphenyl carbonate (5 moles) using the procedure described in Synthesis Example 1 above. The resultant product was a urea chain extended diamine of approximately 12,000 molecular weight (confirmed by titration, using the method described above).

Synthesis Example 3

Preparation of AcAmine

A sample of Polyamine-1 (1 mole) was mixed with a sample of VDM (2 moles) and permitted to react overnight with stirring.

Example 1

To a stirred sample of UBDA 8K (1 mole) was added slowly a sample of VDM (2 moles) at room temperature. The mixture was stirred and allowed to react overnight. A sample of Photoinitiator-1 was added (0.5% by weight). The resultant mixture was cast between PET and a Release Liner on a knife die and marble bed hand spread coater to a thickness appropriate for the test to be run on the sample and cured under high intensity UV exposure using a Fusion UV lamp from Fusion UV Systems, Inc. with an output of 600 W/inch (236 W/cm) and with a belt speed of 20 feet per minute (6 meters per minute). Wet out testing to glass, 90° Peel adhesion to glass (initial and after aging for 1 week at 70° C.) were carried out using the test methods described above. The results are presented in Table 1.

Example 2

To a stirred sample of UBDA 8K (1 mole) was added slowly a sample of IEM (2 moles) at room temperature. The mixture was stirred and allowed to react overnight. A sample of Photoinitiator-1 was added (0.5% by weight). The resultant mixture was cast between PET and a Release Liner on a knife die and marble bed hand spread coater to a thickness appropriate for the test to be run on the sample and cured under low intensity UV exposure using 40 Watt, 350 nanometer bulbs for 10 minutes. Wet out testing to glass, 90° Peel adhesion to glass (initial and after aging for 1 week at 70° C.) were carried out using the test methods described above. The results are presented in Table 1.

Example 3

To a stirred sample of UBDA 12K (1 mole) was added slowly a sample of VDM (2 moles) at room temperature. The mixture was stirred and allowed to react overnight. A sample of Photoinitiator-1 was added (0.5% by weight). The resultant mixture was cast between PET and a Release Liner on a knife die and marble bed hand spread coater to a thickness appropriate for the test to be run on the sample and cured under low intensity UV exposure using 40 Watt, 350 nanometer bulbs for 10 minutes. Wet out testing to glass, 90° Peel adhesion to glass (initial and after aging for 1 week at 70° C.) were carried out using the test methods described above. The results are presented in Table 1.

Example 4

To a stirred sample of UBDA 12K (1 mole) was added slowly a sample of IEM (2 moles) at room temperature. The mixture was stirred and allowed to react overnight. A sample of Photoinitiator-1 was added (0.5% by weight). The resultant mixture was cast between PET and a Release Liner on a knife die and marble bed hand spread coater to a thickness appropriate for the test to be run on the sample and cured under low intensity UV exposure using 40 Watt, 350 nanometer bulbs for 10 minutes. Wet out testing to glass, 90° Peel adhesion to glass (initial and after aging for 1 week at 70° C.) were carried out using the test methods described above. The results are presented in Table 1.

Comparative Example C1

A sample of AcAmine and Photoinitiator-2 (0.5% by weight) was cast between PET and a Release Liner on a knife die and marble bed hand spread coater to a thickness appropriate for the test to be run on the sample and cured under high intensity UV exposure using a Fusion UV lamp from Fusion UV Systems, Inc. with an output of 600 W/inch (236 W/cm) and with a belt speed of 20 feet per minute (6 meters per minute). Wet out testing to glass, 90° Peel adhesion to glass (initial and after aging for 1 week at 70° C.) were carried out using the test methods described above. The results are presented in Table 1.

TABLE 1

| Example | Initial 90° Peel from Glass (N/dm) | 90° Peel from Glass after aging 1-week 70° C. (N/dm) | Wet-out to glass Speed (sec/cm²) |
|---|---|---|---|
| 1 | 3.12 | 6.04 | 0.55 |
| 2 | 1.59 | 1.56 | 0.84 |
| 3 | 5.17 | 12.74 | 1.39 |
| 4 | 3.90 | 10.31 | 2.08 |
| C1 | 0.31 | 0.39 | 0.24 |

Example 5

To a stirred sample of UBDA 8K (1 mole) was added slowly a sample of IPDI (2 moles, 30% solids in toluene) at room temperature. The mixture was stirred and allowed to react overnight. To this mixture was added a sample of HEA (2 moles) and urethane catalyst dibutyltin dilaurate (0.5% by weight) and the mixture was stirred overnight. A sample of Photoinitiator-1 was added (0.5% by weight). The resultant mixture was cast between 127 micrometer thick PET and a Release Liner on a knife die and marble bed hand spread coater to a thickness of 76 micrometers (3 mils) and cured under low intensity UV exposure using 40 Watt, 350 nanometer bulbs for 10 minutes.

Example 6

To a stirred sample of UBDA 8K (1 mole) was added slowly a sample of VDM (2 moles) at room temperature. The mixture was stirred and allowed to react overnight. To this was added a sample of AcAmine to give a weight ratio of VDM capped UBDA 8K:AcAmine of 75:25. A sample of Photoinitiator-2 was added (0.5% by weight). The resultant mixture was cast between PET and a Release Liner on a knife die and marble bed hand spread coater to a thickness appropriate for the test to be run on the sample and cured under high intensity UV exposure using a Fusion UV lamp from Fusion UV Systems, Inc. with an output of 600 W/inch (236 W/cm) and with a belt speed of 20 feet per minute (6 meters per minute). Wet out testing to glass, 90° Peel adhesion to glass (initial and after aging for 1 week at 70° C.) were carried out using the test methods described above. The results are presented in Table 2.

Example 7

To a stirred sample of UBDA 8K (1 mole) was added slowly a sample of VDM (2 moles) at room temperature. The mixture was stirred and allowed to react overnight. To this was added a sample of IPM to give a weight ratio of VDM capped UBDA 8K:IPM of 75:25. A sample of Photoinitiator-2 was added (0.5% by weight). The resultant mixture was cast between PET and a Release Liner on a knife die and marble bed hand spread coater to a thickness appropriate for the test to be run on the sample and cured under high intensity UV exposure using a Fusion UV lamp from Fusion UV Systems, Inc. with an output of 600 W/inch (236 W/cm) and with a belt speed of 20 feet per minute (6 meters per minute). Wet out testing to glass, 90° Peel adhesion to glass (initial and after aging for 1 week at 70° C.) were carried out using the test methods described above. The results are presented in Table 2.

Example 8

To a stirred sample of UBDA 8K (1 mole) was added slowly a sample of VDM (2 moles) at room temperature. The mixture was stirred and allowed to react overnight. To this was added a sample of PPG to give a weight ratio of VDM capped UBDA 8K:PPG of 75:25. A sample of Photoinitiator-2 was added (0.5% by weight). The resultant mixture was cast between PET and a Release Liner on a knife die and marble bed hand spread coater to a thickness appropriate for the test to be run on the sample and cured under high intensity UV exposure using a Fusion UV lamp from Fusion UV Systems, Inc. with an output of 600 W/inch (236 W/cm) and with a belt speed of 20 feet per minute (6 meters per minute). Wet out testing to glass, 90° Peel adhesion to glass (initial and after aging for 1 week at 70° C.) were carried out using the test methods described above. The results are presented in Table 2.

TABLE 2

| Example | Initial 90° Peel from Glass (N/dm) | 90° Peel from Glass after aging 1-week 70° C. (N/dm) | Wet-out to glass Speed (sec/cm²) |
|---|---|---|---|
| 1 | 3.12 | 6.04 | 0.55 |
| 6 | 1.85 | 4.47 | 0.39 |
| 7 | 1.42 | 3.31 | 0.08 |
| 8 | 6.97 | 7.28 | 0.32 |

Example 9

Samples were prepared as described in Example 1 above and extended aging testing was carried out by 90° Peel adhesion to glass (initial and after aging for 1 week at 70° C., 3 weeks at 70° C., and 6 weeks at 70° C.) were carried out using the test method described above. The results are presented in Table 3.

TABLE 3

| Aging Time at 70° C. | 90° Peel Adhesion (N/dm) |
|---|---|
| Initial (0 hours) | 3.12 |
| 1 week (168 hours) | 6.04 |
| 3 weeks (500 hours) | 7.12 |
| 6 weeks (1000 hours) | 6.70 |

What is claimed is:

1. An adhesive comprising a cured mixture comprising:
at least one X—B—X reactive oligomer, wherein
X comprises an ethylenically unsaturated group,
and B comprises a non-silicone segmented urea-based unit, wherein the X—B—X reactive oligomer is the reaction product of a non-silicone segmented urea-based diamine and a Z—W—Z material, wherein Z comprises an amine-reactive group and W comprises a linking group, followed by the reaction with a Y—X material wherein X comprises an ethylenically unsaturated group, and Y comprises a Z-reactive group, and wherein the non-silicone segmented urea-based diamine is the reaction product of a polyoxyalkylene diamine with a diaryl carbonate; and
an initiator, wherein the adhesive is a pressure sensitive adhesive.

2. The adhesive of claim 1, wherein Z—W—Z comprises a diisocyanate and Y—X comprises a hydroxyl-functional (meth)acrylate.

3. The adhesive of claim 1, wherein the adhesive is a self-wetting and removable adhesive.

4. The adhesive of claim 1, wherein cured mixture further comprises an ethylenically unsaturated material.

5. The adhesive of claim 1, further comprising at least one additive, wherein the additive comprises a pressure sensitive adhesive, a plasticizing agent, a tackifying agent or a mixture thereof.

6. The adhesive of claim 5, comprising 5-60 weight % of added pressure sensitive adhesive and 5-55 weight % plasticizer.

7. The adhesive of claim 5, wherein the plasticizer comprises isopropyl myristate.

8. The adhesive of claim 6, wherein the added pressure sensitive adhesive comprises a (meth)acrylate pressure sensitive adhesive.

9. A polymerizable reactive oligomer comprising the structure X—B—X, wherein X comprises an ethylenically unsaturated group and B comprises a non-silicone segmented urea-based unit.

10. The reactive oligomer of claim 9, wherein the non-silicone segmented urea-based unit comprises at least one urea group and at least one oxyalkylene group.

11. An adhesive comprising a cured reaction mixture, the reaction mixture comprising:
at least one X—B—X reactive oligomer, wherein
X comprises an ethylenically unsaturated group,
and B comprises a non-silicone segmented urea-based unit; and wherein the X—B—X reactive oligomer is the reaction product of a non-silicone segmented urea-based diamine and a Z—X material, wherein X comprises an ethylenically unsaturated group, and Z comprises an amine-reactive group, wherein the amine-reactive group Z reacts with an amine group of the non-silicone segmented urea-based diamine and wherein the non-silicone segmented urea-based diamine is the reaction product of a polyoxyalkylene diamine with urea; and
an initiator; and wherein the adhesive is a pressure sensitive adhesive or a heat activated adhesive.

12. The adhesive of claim 11, wherein Z comprises an isocyanate, an azlactone, an anhydride or a combination thereof.

13. The adhesive of claim 11, wherein the adhesive is a self-wetting and removable adhesive.

14. The adhesive of claim 11, wherein the cured mixture further comprises an ethylenically unsaturated material.

15. The adhesive of claim 11, further comprising an additive, wherein the additive comprises a pressure sensitive adhesive, a plasticizing agent, a tackifying agent or mixture thereof.

16. The adhesive of claim 15, comprising 5-60 weight % pressure sensitive adhesive and 5-55 weight % plasticizer.

17. The adhesive of claim 15, wherein the pressure sensitive adhesive comprises an acid-containing (meth)acrylate pressure sensitive adhesive.

18. A method of preparing an adhesive comprising:
providing a curable composition comprising:
at least one X—B—X reactive oligomer, wherein X comprises an ethylenically unsaturated group, and B comprises a non-silicone segmented urea-based unit, wherein the X—B—X reactive oligomer is the reaction product of a non-silicone segmented urea-based diamine and a Z—W—Z material, wherein Z comprises an amine-reactive group and W comprises a linking group, followed by the reaction with a Y—X material wherein X comprises an ethylenically unsaturated group, and Y comprises an Z-reactive group, wherein Z—W—Z comprises a diisocyanate and Y—X comprises a hydroxyl-functional (meth)acrylate;
and an initiator; and
curing the curable composition; wherein the adhesive is a pressure sensitive adhesive.

19. The method of claim 18, wherein the non-silicone segmented urea-based diamine is the reaction product of a polyoxyalkylene diamine with a diaryl carbonate.

20. The method of claim 18, wherein the non-silicone segmented urea-based diamine is the reaction product of a polyoxyalkylene diamine with urea.

21. An adhesive article comprising:
a pressure sensitive adhesive comprising the cured reaction product of at least one X—B—X reactive oligomer, wherein X comprises an ethylenically unsaturated group,
and B comprises a non-silicone segmented urea-based unit wherein the X—B—X reactive oligomer is the reaction product of a non-silicone segmented urea-based diamine and a Z—X material, wherein X comprises an ethylenically unsaturated group, and Z comprises
an amine-reactive group, wherein the amine-reactive group Z reacts with an amine group of the non-silicone segmented urea-based diamine and wherein the non-silicone segmented urea-based diamine is the reaction product of a polyoxyalkylene diamine with urea; and a substrate.

22. The adhesive article of claim 21, wherein the pressure sensitive adhesive further comprises at least one additive, wherein the additive comprises a pressure sensitive adhesive, a plasticizing agent, a tackifying agent, or a mixture thereof.

23. The adhesive article of claim 22, wherein additive pressure sensitive adhesive comprises an acid-containing (meth)acrylate pressure sensitive adhesive.

24. The adhesive article of claim 22, wherein the plasticizer comprises isopropyl myristate.

25. The adhesive article of claim 21, wherein the substrate is a tape backing, a film, a sheet, or a release liner.

* * * * *